United States Patent [19]

Kalfoglou

[11] 4,194,565
[45] * Mar. 25, 1980

[54] SURFACTANT OIL RECOVERY METHOD FOR USE IN HIGH TEMPERATURE FORMATIONS CONTAINING WATER HAVING HIGH SALINITY AND HARDNESS

[75] Inventor: George Kalfoglou, Houston, Tex.

[73] Assignee: Texaco Inc., White Plains, N.Y.

[*] Notice: The portion of the term of this patent subsequent to Apr. 12, 1994, has been disclaimed.

[21] Appl. No.: 890,332

[22] Filed: Mar. 27, 1978

Related U.S. Application Data

[63] Continuation-in-part of Ser. No. 786,165, Apr. 11, 1977, Pat. No. 4,120,358, which is a continuation-in-part of Ser. No. 643,965, Dec. 24, 1975, Pat. No. 4,016,932.

[51] Int. Cl.² ............................................. E21B 43/22
[52] U.S. Cl. ............................. 166/275; 252/8.55 D; 252/351
[58] Field of Search .............. 166/272, 273, 274, 275, 166/303; 252/8.55 D

[56] References Cited

U.S. PATENT DOCUMENTS

| 1,970,578 | 8/1934 | Schoeller et al. ............... 260/458 |
| 2,233,381 | 2/1941 | DeGroote et al. .............. 252/8.55 |
| 3,811,504 | 5/1974 | Flournoy et al. ............. 252/8.55 X |
| 3,811,505 | 5/1974 | Flournoy et al. ............. 252/8.55 X |
| 3,827,497 | 8/1974 | Dycus et al. .................... 166/274 |
| 4,016,932 | 4/1977 | Kalfoglou ........................ 166/303 |

Primary Examiner—Herbert B. Guynn
Attorney, Agent, or Firm—Carl G. Ries; Thomas H. Whaley; Jack H. Park

[57] ABSTRACT

Disclosed is an aqueous surfactant fluid and an oil recovery method employing the fluid, the fluid containing at least two different surfactants: (1) An organic sulfonate anionic surfactant such as a petroleum sulfonate, or an alkyl or alkylaryl sulfonate, and (2) a dipolyalkoxylated, preferably dipolyethoxylated alkyl catechol, wherein the balance between the oil soluble alkyl group and water soluble ethoxy group is chosen to ensure effective capillary displacement at the formation temperature in water having a salinity about equal to the salinity of the formation water, and the total number of ethoxy groups is chosen so the cloud point of the ethoxylated alkyl catechol is from 2° to 40° F. greater than the formation temperature.

5 Claims, 5 Drawing Figures

SURFACTANT OIL RECOVERY METHOD FOR USE IN HIGH TEMPERATURE FORMATIONS CONTAINING WATER HAVING HIGH SALINITY AND HARDNESS

CROSS REFERENCE TO RELATED APPLICATIONS

This application is a continuation-in-part of application Ser. No. 786,165, filed Apr. 11, 1977 now U.S. Pat. No. 4,120,358 for Surfactant Oil Recovery Method for Use in High Temperature Formations Containing Water Having High Salinity and Hardness, which is a Continuation-in-Part of application Ser. No. 643,965, filed Dec. 24, 1975 for An Improvement Relating to Surfactant Oil Recovery Method For Use in High Temperature Formations Containing Water Having High Salinity and Hardness, now U.S. Pat. No. 4,016,932 issued Apr. 12, 1977.

FIELD OF THE INVENTION

This invention relates to an oil recovery process employing an aqueous fluid containing two or more surfactants, at least one of which is a dipolyethoxylated alkyl catechol for use in recovering oil from formations containing water having high salinity and hardness, whose temperatures are greater than about 80° F.

BACKGROUND AND PRIOR ART

Petroleum is found in subterranean formations and reservoirs in which it has accumulated, and recovery is initially accomplished by pumping or permitting the petroleum to flow to the surface of the earth through wells drilled into and in fluid communication with subterranean formations. Petroleum can be recovered from subterranean formations to any degree only if certain conditions exists. There must be an adequately high concentration of petroleum in the pore space of the formation, and there must be adequate permeability or interconnected flow channels throughout the formation to permit the flow of fluids therethrough if sufficient pressure is applied to the fluid. When the subterranean, petroleum-containing formation has natural energy present in the form of an underlying active edge or bottom water drive, solution gas or a high pressure gas cap above the petroleum, this natural energy source is utilized to recover petroleum. In this primary phase of petroleum recovery, petroleum flows to the surface of wells drilled into the formation. When the natural energy source is depleted, or in the instance of these formations which do not originally contain sufficient natural energy to permit primary recovery operations, some form of supplemental recovery process must be applied to the reservoir.

Waterflooding is a commonly employed method for recovering additional amounts of petroleum beyond the amount recoverable by primary means, and comprises injecting field water into the formation to displace petroleum through the formation to the production well. Water does not displace petroleum efficiently, however, since oil and water are immiscible and the interfacial tension between water and oil is quite high. After completion of primary and secondary recovery, it is common to find that from 50 to 70 percent of the oil originally present in the formation still remains unrecovered in the formation.

It is recognized in the prior art that waterflooding can only recover a fraction of the oil present in the formation, and many prior art references disclose the use of water containing additives which decrease the interfacial tension between the injected water and formation petroleum. Petroleum sulfonates have been disclosed in many references for use in oil recovery operations, but petroleum sulfonates are limited with respect to formation water salinity, hardness, and other factors which greatly reduce their applicability.

U.S. Pat. Nos. 3,508,612; 3,792,731; 3,811,504; 3,811,505; 3,811,507; 3,827,497; 3,858,656 and 4,016,932 describe oil recovery methods employing fluids containing a combination of surfactants which permit application of surfactant waterflooding processes to formations containing higher salinity and/or higher concentrations of divalent ions such as calcium and magnesium.

While the foregoing multi-component surfactant systems effectively recover oil from some formations, other formations present problems in the use of at least certain of these systems. With respect to those systems requiring the use of a nonionic surfactant as a solubilizing co-surfactant with a primary surfactant such as petroleum sulfonate or other organic sulfonate, commonly available nonionic surfactants exhibit cloud point phenomena which regularly restrict their applicability. The cloud point of a nonionic surfactant is the temperature above which the nonionic surfactant is relatively insoluble, and nonionic surfactants must be soluble in order to solubilize the primary anionic surfactant for use in high salinity environments. It is believed that problems which have been encountered employing fluids containing nonionic surfactants in high temperature formations, which are manifest in phase separation phenomena, are associated with the cloud point of a nonionic surfactant. It is known in the art that the cloud point of polyethoxylated alkyl phenols, for example, increase with the degree of ethoxylation, i.e. with the average number of ethoxy groups contained in the molecule. It is also known that the cloud point decreases as the salinity of the surfactant solution increases. For example, an ethoxylated nonyl phenol having 10 ethoxy groups per molecule will ordinarily have a cloud point of about 130° F. in essentially pure water, but the cloud point is reduced to about 85° F. in a 10 percent sodium chloride brine solution. It is further known that the maximum detergency using an aqueous solution of polyethoxylated alkyl phenol occurs at the cloud point of a particular ethoxylate. See for example, "Nonionic Surfactants" by Ed Martin, J. Schick, published by Marcell Dekker Inc., New York 1967. It is not taught in the literature, however, that how the cloud point of an ethoxylated nonionic surfactant which is being used in combination with one or more dissimilar surfactants in an oil recovery process being applied to a formation containing high concentrations of divalent ions such as calcium and magnesium as well as high salinities, affects the efficiency of a surfactant fluid for low surface tension displacement of petroleum.

In view of the foregoing discussion, it can be readily appreciated that there is a significant commercial need for an oil recovery method which can be applied to formations containing high salinity and hard water, which formations are at temperatures greater than 80° F. (27° C.), e.g. from about 80° to about 180° F. (27° C. to about 82° C.).

SUMMARY OF THE INVENTION

I have discovered that surfactant waterflooding may be accomplished effectively in high temperature, high salinity formations, e.g. formations whose temperature is in the range of from about 80° to about 180° F. (27° to 82° C.), the water salinity being from 40,000 to 140,000 parts per million total dissolved solids which may include from 2,000 to 12,000 parts per million divalent ions such as calcium and/or magnesium, by employing in the surfactant waterflood process, an aqueous fluid having a salinity and divalent ion concentration approximately equal to the salinity and divalent ion concentration of the formation water, and containing two surfactants. The first surfactant is an organic sulfonate anionic primary surfactant such as petroleum sulfonate, preferably a water soluble sodium, potassium, lithium or ammonium salt of petroleum sulfonate whose medium equivalent weight is in the range of from about 325 to about 480, or a synthetic sulfonate having the following formula:

wherein R is an alkyl group, linear or branched, containing from 5 to 25 carbon atoms and preferably from 8 to 18 carbon atoms, or an alkylaryl group such as benzene, toluene or xylene having attached thereto an alkyl chain, linear or branched, containing from 5 to 20 and preferably from 6 to 16 carbon atoms in the alkyl chain; and X is sodium, potassium, lithium or ammonium.

(2) A dipolyethoxylated catechol nonionic surfactant having the following formula:

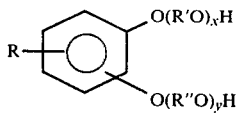

wherein R is an alkyl group, linear or branched, containing from 5 to 25 and preferably from 8 to 20 carbon atoms, R' and R" are each ethylene or a mixture of ethylene and higher alkylene such as propylene with relatively more ethylene than higher alkylene, preferably at least 60 percent ethylene, and x and y are each 1 to 12 and the sum of x and y is from 2 to 24 and preferably from 4 to 14. The balance between the alkyl group and the polyalkoxylated alkyl catechol and the total number of ethoxy groups in the ethoxy or alkoxy chain are both selected to ensure the nonionic surfactant is soluble and capable of reducing interfacial tension in an aqueous fluid having a salinity and hardness about equal to the salinity and hardness of the formation water, and further adjusted to ensure that the cloud point of the nonionic surfactant is from 2° to 40° F. (1° to 22° C.) greater than the temperature of the formation into which the fluid is injected.

DESCRIPTION OF THE PREFERRED EMBODIMENTS

Figure 1:
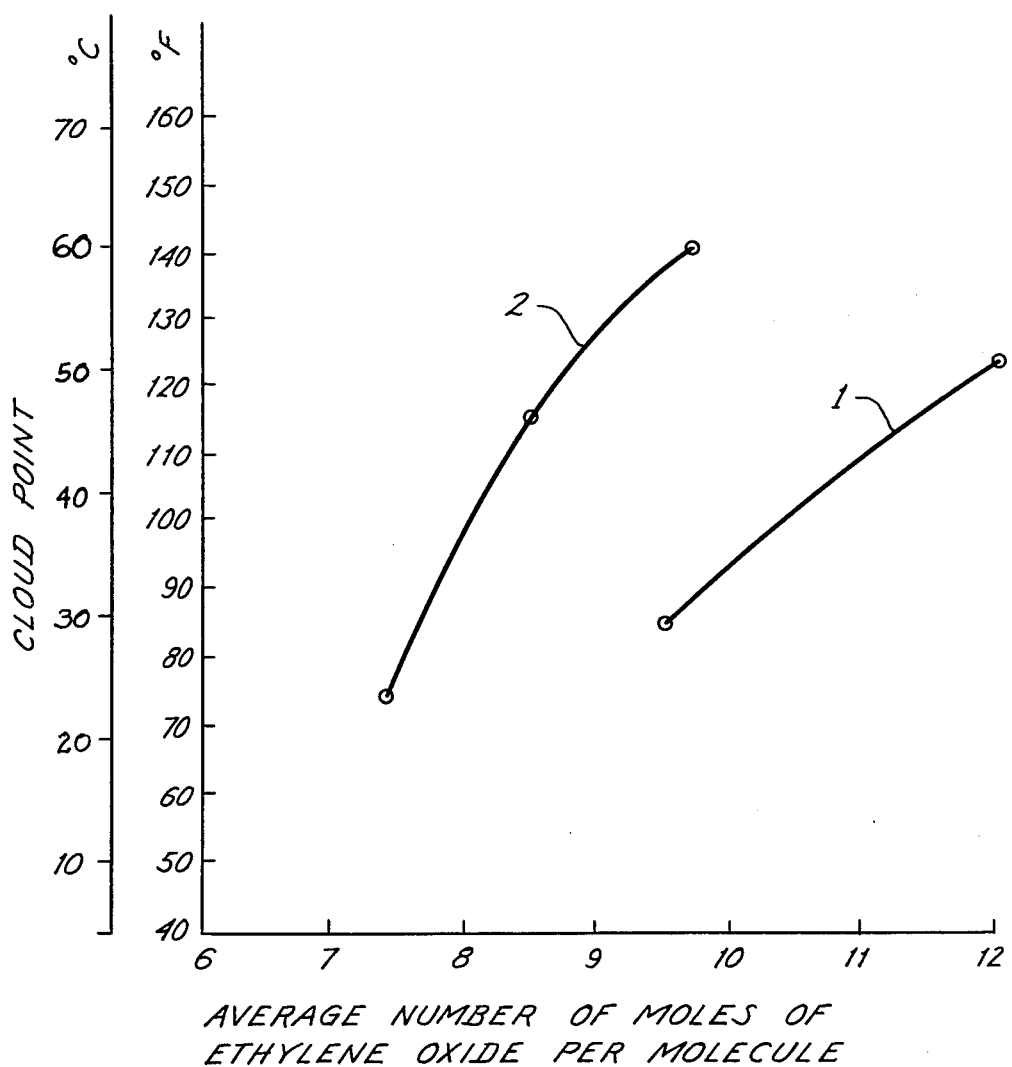
FIG. 1 illustrates the relationship of cloud point of both a conventional polyethoxylated alkyl phenol and a dipolyethoxylated alkyl catechol as a function of the average number of moles of ethylene oxide per molecule.

This invention concerns a surfactant waterflooding oil recovery method applicable to subterranean, petroluem-containing formations having relatively high salinity water, e.g. water containing from 40,000 to about 120,000 parts per million total dissolved solids, which may include from 2,000 to 12,000 parts per million divalent ions such as calcium or magnesium. The process is applicable to formations at temperatures from about 80° to about 180° F. which is significantly greater than the temperature in which nonionic surfactants having single ethoxy chains may be employed.

I have found that the degree of ethoxylation, e.g. the average total number of ethoxy groups present in the two ethoxy chains attached to the catechol molecule of a dipolyethoxylated alkyl catechol nonionic surfactant which is to be used as a solubilizer co-surfactant with an anionic primary surfactant, which will usually be an organic sulfonate such as petroleum sulfonate, alkyl sulfonate or an alkylaryl sulfonate, is very critical. Furthermore, I have found that the dipolyethoxylated alkyl phenol exhibits substantially greater cloud point values, and hence can be used in higher temperature formations, than is possible with the single ethoxy chain nonionic surfactant such as polyethoxylated alkyl phenol, even if the total number of ethoxy groups per molecule is about the same. In high salinity, hard water formations, it is necessary to adjust the degree of ethoxylation precisely based on tests performed at the formation temperature using an aqueous solution whose salinity and polyvalent ion concentration very nearly matches the salinity and polyvalent ion concentration of the formation water in which the surfactant flood is to be performed. Furthermore, it is necessary to balance the number of ethoxy groups with the length of the alkyl chain, which comprises the oil soluble portion of the surfacant molecule, in order to obtain optimum capillary displacement, which is equivalent to sufficiently low interfacial tension for efficient low surface tension oil recovery purposes, and further to adjust the cloud point of the dipolyethoxylated alkyl catechol to a value which is from 2° F. to 40° F. greater than the formation temperature in degrees F. (1° to 22° C. above the formation temperature in degrees Centigrade).

The surfactant fluid employed in the oil recovery process of my invention comprises at least two surfactants which are described below.

(1) An organic sulfonate anonic surfactant such as petroleum sulfonate, preferably a water soluble, sodium, potassium, lithium or ammonium salt of petroleum sulfonate whose median equivalent weight is from 325 to 480, or a synthetic sulfonate having the following formula:

$$RSO_3X$$

wherein R is an alkyl group, linear or branched, containing from 6 to 25 carbon atoms and preferably from 8 to 18 carbon atoms, or an alkylaryl group such as benzene, toluene or xylene having attached thereto an alkyl chain, linear, or branched containing from 5 to 20 and preferably from 6 to 16 carbon atoms in the alkyl chain, X is sodium, potassium, lithium or ammonium; and (2) A dipolyalkoxylated alkyl catechol nonionic surfactant having the following formula:

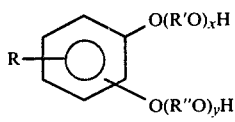

wherein R is an alkyl group, linear or branched, containing from 5 to 25 and preferably from 8 to 20 carbon atoms, R' and R" are each ethylene or a mixture of ethylene and higher alkylene such as propylene with relatively more ethylene than higher alkylene, preferably at least 60 percent ethylene; and x and y are each 1 to 12 and the sum of x and y is from 2 to 24 and preferably from 4 to 14.

A third general type of surfactant is sometimes utilized, which will be in addition to the above-identified types of surfactant. This additional surfactant is a sulfated or a sulfonated, alkoxylated alkyl or alkylaryl compound. Preferably, the third surfactant is an alkylpolyalkoxy sulfate or alkylarylpolyalkoxy sulfate. In another embodiment, a third surfactant is used, which is an alkyl or alkylarylpolyalkoxyalkylene sulfonate having the following formula:

$$R(R'O)_xR"SO_3X$$

wherein R is an alkyl group having from 6 to 25 carbon atoms or an alkylaryl group having from 5 to 20 carbon atoms in the alkyl chain, R' is ethylene or a mixture of ethylene and higher alkylene with relatively more ethylene than higher alkylene, x is a number from 1 to 20, R" is ethylene, propylene, hydroxy propylene or butylene, and X is sodium, potassium, lithium or ammonium. This sulfonated or sulfated and alkoxylated surfactant is employed in particularly high salinity and/or high temperature formations, as it extends the salinity and temperature range of the two components as described above. The remainder of this disclosure will be directed to the two component system comprising an anionic surfactant such as petroleum sulfonate and a dipolyethyoxylated alkyl catechol nonionic surfactant, but it is to be understood that any of the following disclosure may be equally applicable to a three component system which contains an additional component, which will be an alkyl or alkylaryl polyethoxy sulfate or sulfonate.

While optimum results are obtained employing a fluid whose concentration of each component is determined by carefully measuring the variation in surfactant flooding effectiveness with surfactant concentration, the following general guidelines are helpful. The concentration of the primary anionic surfactant, e.g., the petroleum sulfonate or synthetic organic sulfonate will ordinarily be in the range from about 0.05 to about 10 and preferably from about 0.2 to 5 percent by weight. The concentration of the dipolyethoxylated alkyl catechol nonionic surfactant will ordinarily be from 0.01 to 10 and preferably from 0.2 to 6 percent by weight. Once the optimum effective concentration of each of these components is established, it is sometimes necessary to include additional amounts of each material in the first 10 or 20 percent of the pore volume of surfactant fluid injected into the formation, where it is determined or known that a significant surfactant loss will occur as a consequence of adsorption of surfactant from solution by the formation rock, or other factors. Ordinarily the concentration may be increased as much as two or three times the values determined to be optimum, with the ratio being held constant or varied if it is determined that adsorption is preferential for one or the other of the surfactant species.

Other materials and fluids normally applied in combination with surfactant flooding may be applied in connection with the surfactant waterflood process employing the process of my invention. Ordinarily a preflush is not necessary for the purpose of adjusting salinity and hardness of the formation water since the process of my invention involves adjusting the surfactant characteristics to ensure optimum effectiveness at salinity and hardness values about equal to the salinity and hardness of the formation water. A preflush may be utilized for other purposes, however, such as for example introducing a preferentially adsorbed material into the formation prior to injecting the surfactant fluid for the purpose of reducing the amount of surfactant adsorbed from the surfactant fluid. Such materials may be also incorporated in the surfactant fluid itself. It is ordinarily desirable to follow the surfactant fluid by injecting from 0.1 to 2.0 pore volumes of an aqueous fluid containing a hydrophilic viscosity increasing polymer such as for example partially hydrolyzed polyacrylamide or a copolymer of acrylamide and acrylate, or a polysaccharide, in a concentration from about 100 to about 2,000 parts per million, which is ordinarily sufficient to ensure a favorable mobility ratio between the displacing fluid and the surfactant fluid. This may then be followed by field brine to displace all of the injected fluid through the formation, recovering petroleum from a remotely located production well until the injected field water breaks through at that well, signifying the end of the enhanced recovery program.

It is well known that when a two component system is utilized for the purpose of tailoring the surfactant fluid performance to the salinity and hardness of the formation water, the concentration of each of the materials is very critical and extensive laboratory tests should be performed to design the optimum surfactant. As stated above, the concentration of each surfactant present in the fluid will normally be in the range from about 0.05 to about 10 percent and preferably from 0.2 to 5 percent by weight. The ratio of the primary anionic surfactant to the dipolyethoxylated alkyl catechol surfactant is generally inversely related to the salinity and total hardness of the aqueous fluid in which it is to be utilized. Although the best results will ordinarily be obtained when the exact ratio of the surfactants is identified by experimentation, preferably using formation water obtained from the formation into which the surfactant fluid is to be injected and at temperatures about equal to the formation temperature, the following general rule of thumb is provided as a preliminary estimate in order to arrive at suitable ratios for initial experimentation. If the formation water hardness is from about 2000 to about 6000 parts per million, the ratio of anionic to nonionic surfactants should be from about 3:1 to about 1:1. For formation water whose total hardness is in the range from about 5000 to about 12,000 parts per million, the ratio of anionic to nonionic surfactant should be from about 2:1 to about 1:3.

The molecular characteristics of a surfactant used is similarly an important factor. For example, equivalent weight of petroleum sulfonate, or the number of carbon atoms and ethoxy groups in the nonionic surfactant, all affect the performance of the multi-component surfactant fluid in any particular crude oil in formation water salinity, hardness and temperature values.

In the practice of the process of my invention, ordinarily the formation into which the surfactant solution will be injected will have been subjected to waterflooding, which will generally be continued until the water-oil ratio rises to a value which makes further oil recovery uneconomical. Although this is not a necessary first step for the proper functioning of the process of my invention, waterflooding will ordinarily be practiced in the field if any significant amount of additional oil can be recovered from the formation by a waterflooding process.

After waterflooding has continued until the water-oil ratio at the producing well rises to such a high value that further production of petroleum from the well is impossible or economically unattractive, surfactant flooding may begin.

In the practice of the process of my invention, an aqueous solution or fluid which represents from about 2 to about 100 and preferably from 5 to 50 pore volume percent, based on the pore volume of the formation to be swept by the injected fluid, is injected into the formation. Ordinarily it is preferred that the salinity of the surfactant solution be about equal to the salinity of the formation water, since the surfactant will have been tailored to provide optimum oil recovery efficiency at salinity values about equal to the formation water salinity. Similarly, the concentration of polyvalent ions such as calcium and/or magnesium should be about the same as the concentration of these ions in the formation water. There is sometimes a minimum concentration of polyvalent ions, such as calcium and magnesium, required to avoid phase separation of the surfactant fluids in high temperature formations, which can only be identified by experimentation. When it is found that a minimum level of polyvalent ions is required for phase stability, the concentration of polyvalent ions in the surfactant fluid being injected into the formation must be maintained at or above this minimum concentration.

Once the surfactant to be used in the process of my invention have been identified in a general way, the formation temperature should be determined in order to permit determination of the optimum degree of ethoxylation of the dipolyethoxylated alkyl catechol nonionic surfactant to be employed as a solubilizing co-surfactant with the primary anionic surfactant, e.g. petroleum sulfonate or synthetic organic sulfonate. The cloud point of the dipolyethoxylated alkyl catechol should be adjusted so its cloud point in a fluid having essentially the same salinity and divalent ion concentration as the formation water salinity and divalent ion concentration, is greater than the average formation temperature. Specifically, the cloud point of the dipolyethoxylated alkyl catechol should be from 2 to 40 and preferably from 5° to 20° F. (from 1 to 22 and preferably from 3° to 11° C.) above the formation temperature.

Ordinarily the cloud point of ethoxylated compounds increases with the degree of ethoxylation. This is true with single ethoxy chain nonionic such as polyethoxylated alkylphenols, and also with the dipolyethoxylated alkyl catechols. The cloud point of a dipolyethoxylated alkyl catechol is significantly higher for a dipolyethoxylated alkyl catechol having a given number of ethoxy groups, than for a single ethoxy chain, ethoxylated alkyl phenol having the same number of ethoxy groups. For example, the cloud point in a 10 percent sodium chloride brine of dipolyethoxylated pentadecyl catechol having about 9.5 moles of ethylene oxide per mole of surfactant, is about 138° F., whereas the cloud point of a single ethoxy chain ethoxylated nonyl phenol having 9.5 moles of ethylene oxide per mole of surfactant is about 85° F. Clearly, the advantage for using a dipolyethoxylated alkyl catechol is quite significant, since it extends the usefulness of the surfactant system employing the nonionic surfactant as a solubilizing co-surfactant by about 55° F. without the need for using nonionic surfactants having very large degrees of ethoxylation. Furthermore, the cloud point increases about 30° F. for each mole of ethylene oxide per mole of dipolyethoxylated alkyl catechol, whereas the increase in cloud point for a single chain is only about 17° F. per mole of ethylene oxide. As with single chain ethoxylated nonionic surfactants, the cloud point decreases as the salinity of the fluid in which the surfactant is employed increases, and so it is essential to determine the cloud point of the surfactant to be employed in the particular application in a fluid having a salinity about equal to the salinity of the formation water.

It must be remembered that while increasing the total number of ethoxy groups per molecule increases the cloud point of a dipolyethoxylated alkyl catechol, the solubility of the surfactant in water is also increased as a consequence of increasing the degree of ethoxylation, if the oil soluble fraction is held constant. Multi-component surfactant systems designed in a specific formation water exhibit optimum performance when the surfactant combination is only slightly soluble in the particular salinity in which they are employed, and at the temperature of the formation. If the water solubility of one of the surfactants is increased greatly, as by increasing the degree of ethoxylation to increase the cloud point of the surfactant, the effectiveness of the surfactant system is greatly diminished. Slight increases in degree of ethoxylation can be tolerated; however, if the formation temperature is significantly greater than the cloud point of the surfactant system being considered, e.g. 10° F. or more, care must be exercised in increasing the degree of ethoxylation to adjust the cloud point according to my invention.

I have also found that the concentration of divalent ions such as calcium and/or magnesium in the solution is an unexpectedly critical parameter in its effect on phase stability of the surfactant fluid under oil recovery conditions. It is necessary to maintain the concentration of polyvalent ions at a value which is at least equal to the concentration of these ions in the formation water for which the system is designed. It is sometimes necessary to increase the concentration of divalent ions above the value corresponding to the formation water hardness, in order to ensure phase stability of the surfactant fluid.

In order to evaluate the effectiveness of the present oil recovery method of my invention, and to determine the effect of various parameters on the results obtainable, the following experimental laboratory work was performed.

In the first experiment, a series of dipolyethoxylated pentadecyl catechols having cloud points of 7.4, 8.5, and 9.6 were obtained and their cloud points were measured in 10 percent sodium chloride solution. The values are shown graphically in FIG. 1, in which curve 2 illustrates the cloud point of the dipolyethoxylated pentadecyl catechol in 10 percent sodium chloride brine. For comparison, curve 1 illustrates the cloud point of an ethoxylated nonyl phenol whose ethoxylation varies from 9.5 to 12, and the significant advantage obtainable by use of the dipolyethoxylated alkyl catechol is clearly shown in FIG. 1. The cloud point is significantly higher at equivalent values of ethoxylation for the dipolyethoxylated alkyl catechol as compared to the ethoxylated nonyl phenol for all values of degree of ethoxylation.

Figure 2:
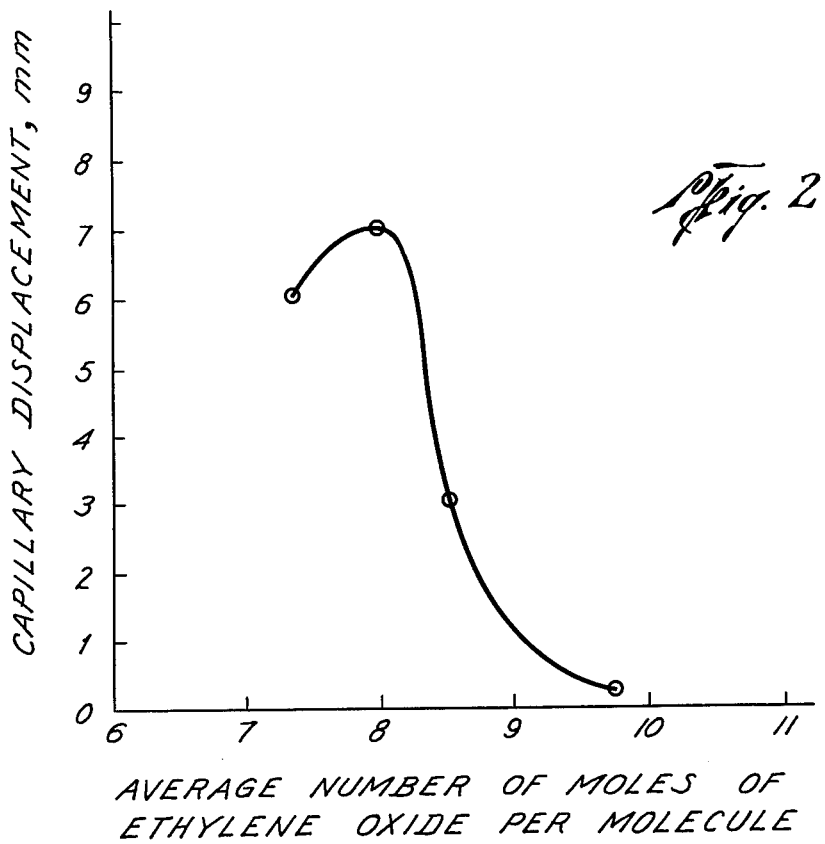
FIG. 2 illustrates the capillary displacement in millimeters as a function of the average number of moles of ethylene oxide per molecule of a dipolyethoxylated alkyl catechol.

In the second series of experiments, capillary displacement tests were employed to measure the effectiveness of a dual surfactant system at a particular salinity level, and to determine the variation of the effectiveness of the system with changes in the average number of moles of ethylene oxide per mole of dipolyethoxylated alkyl catechol. The surfactant system comprised 1.0 percent by weight Sulframin 124 ®, a linear dodecylbenzene sulfonate in combination with 0.6 percent by weight of a pentadecyl catechol whose degree of ethoxylation was varied from 7.4 to 9.7. The capillary displacement values, which are the distances moved by capillary forces in a closed-in glass cell submerged in an aqueous fluid in a 15 minute period, and the values of capillary displacement were determined. These are proportional to the low tension oil recovery displacement effectiveness of a surfactant at that fluid salinity. The salinity of the fluid was 70,000 parts per million total dissolved solids, and the tests in this instance were performed at 78° F. The results are shown graphically in FIG. 2, and it can be seen that optimum capillary displacement is obtained in this environment using a dipolyethoxylated pentadecyl catechol containing an average of 8 moles of ethylene oxide per mole of surfactant. The optimum product for any particular application will be different for different salinity values, temperatures, and to a lesser degree depending on the organic sulfonate with which it is used.

Figure 3:
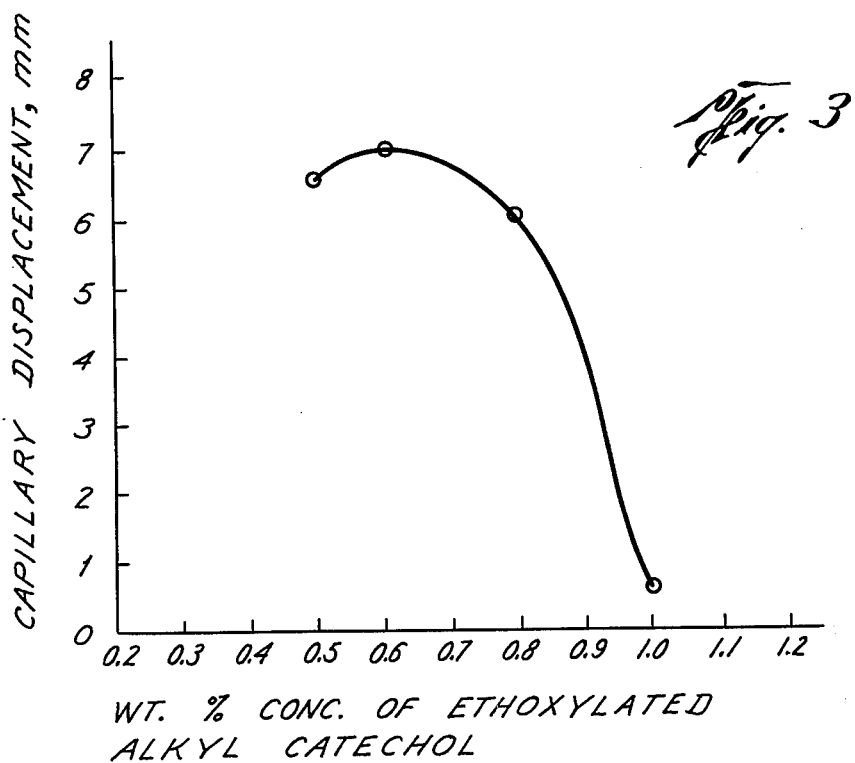
FIG. 3 illustrates the relationship between the capillary displacement in millimeters and percent concentration of the optimum dipolyethoxylated alkyl catechol identified in FIG. 2.

The next experiment examined the effect of varying the concentration of the 8 mole ethylene oxide adduct of pentadecy catechol, identified in the preceeding experiment to be the optimum material for use in this particular salinity, while holding the concentration of organic sulfonates constant. In FIG. 3, the results are shown graphically, illustrating how the capillary displacement varies as the concentration of the 8 mole ethylene oxide adduct of pentadecyl catechol is varied from 0.5 to 1.0 percent by weight in a fluid containing 1.0 percent by weight Sulframin 1240 ® (a linear dodecylbenzene sulfonate). The salinity of the solution is 70,000 parts per million total dissolved solids and the tests were performed at 78° F. It can be seen that the optimum capillary displacement is obtained using 0.6 percent by weight of a dipolyethoxylated alkyl catechol in this fluid.

Figure 4:
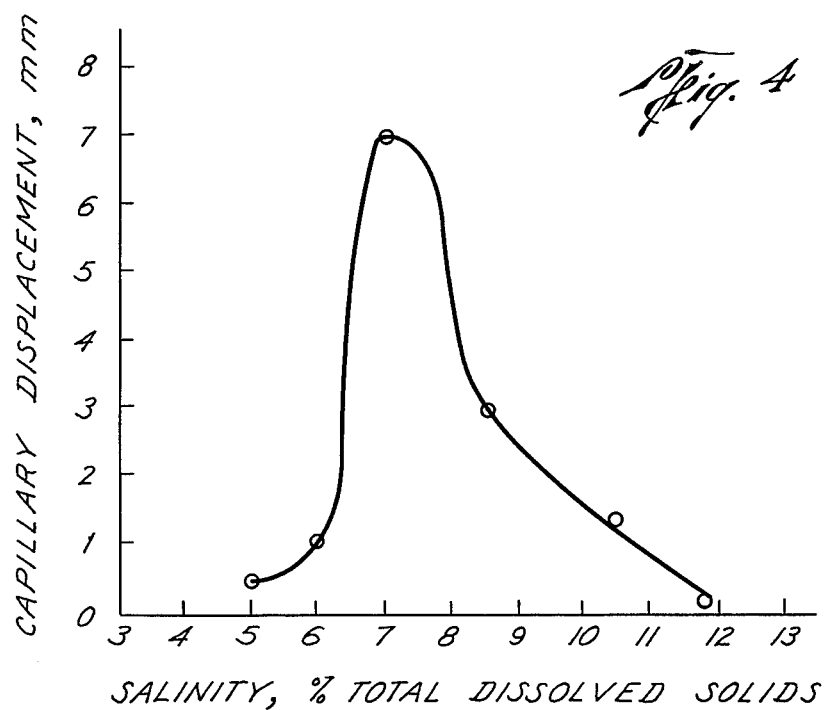
FIG. 4 illustrates the relationship between capillary displacement in millimeters and the salinity of the surfactant fluid in which the optimum dipolyethoxylated alkyl catechol from FIG. 2 is employed.

In the next experiment, the surfactant fluid containing 1.0 percent by weight Sulframin 1240 and 0.6 percent by weight of the 8 mole ethylene oxide adduct of pentadecyl catechol was prepared using different salinity levels. As can be seen from FIG. 4, the capillary displacement varied from very low values at 5 percent by weight salinity to a maximum value at about 7 percent by weight salinity. Beyond salinity levels of 7, the capillary displacement decreased rapidly to about 8.5 percent by weight and then more slowly up to about 12 percent by weight salinity. It is not necessary to have the absolute maximum capillary displacement, but ordinarily the capillary displacement should be greater than about 2 in order to expect effective low surface tension displacement of oil under conditions of the test, and so based on FIG. 4 it will be expected that the surfactant system comprising 1.0 percent by weight Sulframin 1240 and 0.6 percent by weight of the 8 mole ethylene oxide adduct of pentadecyl catechol will be effective over the salinity range of about 6.0 to about 10.0. Ordinarily, the preferred method of applying the process of my invention would be to tailor the surfactant system so the center salinity value of the expected operable range is about equal to the average salinity of the formation, so the surfactant mixture will remain effective and active if the salinity varies throughout the reservoir.

Figure 5:
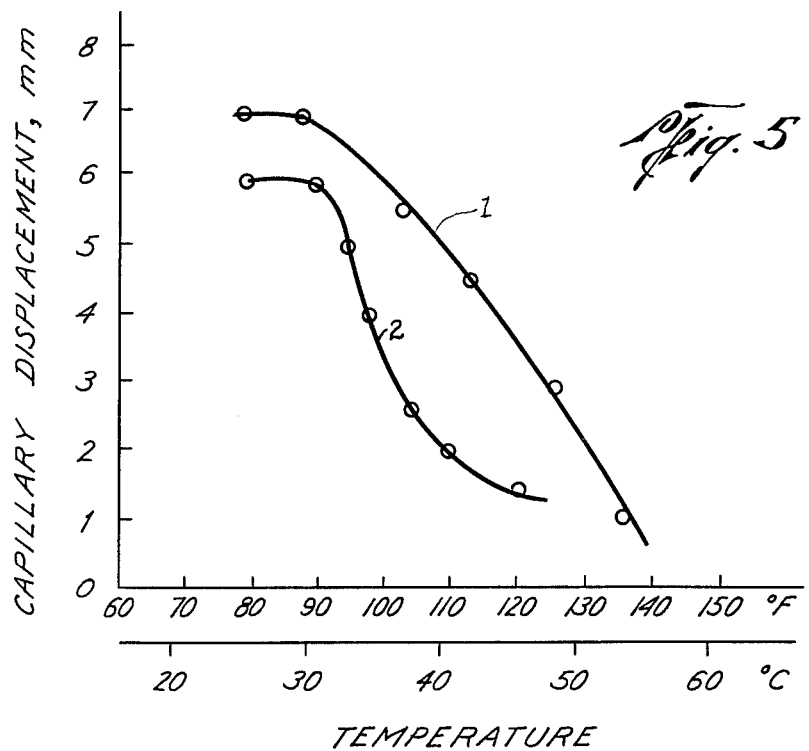
FIG. 5 illustrates the relationship between capillary displacement of a particular dipolyethoxylated alkyl catechol and for comparison a polyethoxylated alkyl phenol surfactant used in combination with a synthetic alkyl benzene sulfonate at a constant salinity as the temperature is varied from 70° to 150° F.

In FIG. 5, capillary displacement tests at elevated temperatures were made using two fluids, one of which is a 9.5 mole ethylene oxide adduct of nonyl phenol and the other being the 8 mole ethylene oxide of pentadecyl catechol. In both instances, the salinity was 70,000 parts per million total dissolved solids, and the concentration of the ethoxylated nonyl phenol was about 1.5 percent by weight as compared to 0.6 percent by weight of the dipolyethoxylated pentadecyl catechol. Both surfactant fluids containing 1 percent by weight Sulframin 1240 ®, and the temperature was varied from about 80° to about 135° F. As can be seen, the effectiveness of the fluid containing dipolyethoxylated alkyl catechol, shown by curve 1 of FIG. 5, was significantly higher at all temperatures than the effectiveness of the ethoxylated nonyl phenol, shown by curve 2 in FIG. 5. Moreover, assuming the minimum capillary displacement for effective oil recovery to be about 2 millimeters displacement, it can be seen that this particular dipolyethoxylated alkyl phenol would be expected to be operable in formations up to about 130° F. at this salinity level, as compared to about 110° F. for the ethoxylated nonyl phenol. This clearly illustrates the superior temperature performance of the dipolyethoxylated alkyl catechol as compared to the ethoxylated nonyl phenol surfactants such as those disclosed in the art.

In instances in applying the process of my invention to high temperature formations, if the ambient surface temperature is significantly less than the formation temperature for which the surfactant system is tailored, it may be necessary to heat the injected fluid to a temperature above surface ambient temperature and preferably about equal to the formation temperature prior to injecting it into the formation to ensure that the optimum temperature exists at the point where oil displacement is occurring. This is generally necessary only in the initial stages since once the surfactant slug has been displaced away from the injection wellbore, it will pass through a substantial amount of formation prior to contacting oil, and so will have achieved a temperature equilibrium therewith.

Thus I have disclosed and demonstrated that the oil recovery effectiveness of a surfactant fluid containing an organic sulfonate and a dipolyethoxylated alkyl catechol is improved significantly by adjusting the degree of ethoxylation of the dipolyethoxylated alkyl catechol so the cloud point of that material is from 2° to 40° F. greater than the temperature of the formation. I have further demonstrated how the dipolyethoxylated alkyl catechol cloud point is significantly greater than the cloud point of a single ethoxy chain ethoxylated alkyl phenol, having about the same degree of ethoxylation, permitting application of the process of my invention to much higher temperature formations than is possible using conventional nonionic surfactants such as the single ethoxy chain ethoxylated alkyl phenols commonly described in the prior art.

While my invention has been described in terms of a number of illustrative embodiments, it is not so limited since many variations thereof will be apparent to persons skilled in the art of oil recovery by surfactant waterflooding without departing from the true spirit and scope of my invention. It is my desire and intention that my invention be restricted and limited only by those restrictions and limitations appearing in the claims appended hereinafter below.

I claim:

1. A method for recovering petroleum from a subterranean, permeable, petroleum-containing formation which formation also contains water having salinity from about 40,000 to about 140,000 parts per million total dissolved solids including from 2,000 to 12,000 parts per million divalent ions including calcium and magnesium, the temperature of said formation being from about 80° F. to about 180° F., said formation being penetrated by at least one injection well and by at least one production well, both wells being in fluid communication with the petroleum formation, comprising:
    (a) injecting into the formation via the injection well, an aqueous, saline, surfactant-containing fluid to displace petroleum through the formation toward the production well, the salinity of the fluid being about equal to the salinity of the formation water, said surfactant containing fluid comprising:
        (1) an organic sulfonate anionic surfactant selected from the group consisting of petroleum sulfonate, alkyl sulfonates having from 6 to 25 carbon atoms, alkylaryl sulfonates having from 5 to 20 carbon atoms in the alkyl chain, and mixtures thereof; and
        (2) a dipolyalkoxylated alkyl catechol having the following formula:

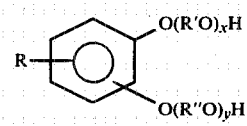

wherein R is an alkyl group, linear or branched, containing from 5 to 25 carbon atoms, R' and R" are each ethylene or a mixture of ethylene and higher alkylene with relatively more ethylene than higher alkylene, x and y are each 1 to 12 and the sum of x and y is from 2 to 24, wherein the total number of ethoxy groups per molecule of said dipolyethoxylated alkyl catechol is chosen so that the cloud point thereof is from 2° to 40° F. greater than the temperature of the formation; and
    (b) recovering petroleum displaced by a surfactant-containing fluid from the formation via the producing well.

2. A method as recited in claim 1 wherein the dipolyalkoxylated alkyl catechol is a dipolyethoxylated alkyl catechol having from 5 to 25 carbon atoms.

3. A method as recited in claim 1 wherein the organic sulfonate primary anionic surfactant is petroleum sulfonate having an average equivalent weight in the range of from about 325 to about 480.

4. A method as recited in claim 1 wherein the surfactant fluid also contains a third surfactant comprising an alkyl or alkylarylpolyalkoxy sulfate.

5. A method as recited in claim 1 wherein the surfactant fluid also contains an alkyl or alkylarylpolyalkoxyalkyl sulfonate of the following formula:

$$R(R'O)_xR''SO_3X$$

wherein R is an alkyl having from 6 to 25 carbon atoms or an alkylaryl containing from 5 to 22 carbon atoms in the alkyl chain, R' is ethylene or a mixture of ethylene and higher alkylene with relatively more ethylene than higher alkylene x is a number from 1 to 20, R" is ethylene, propylene, butylene or hydroxypropylene, and X is sodium, potassium, lithium or ammonium.

* * * * *